(12) United States Patent
Adachi et al.

(10) Patent No.: US 8,275,542 B2
(45) Date of Patent: Sep. 25, 2012

(54) NAVIGATION DEVICE, NAVIGATION METHOD, AND NAVIGATION PROGRAM

(75) Inventors: Kazuhide Adachi, Anjo (JP); Akira Otabe, Suginami (JP); Tomohiro Mitsuya, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 770 days.

(21) Appl. No.: 12/285,991

(22) Filed: Oct. 17, 2008

(65) Prior Publication Data

US 2009/0143974 A1    Jun. 4, 2009

(30) Foreign Application Priority Data

Nov. 30, 2007   (JP) .................................. 2007-310904

(51) Int. Cl.
*G01C 21/00* (2006.01)
*G06K 9/00* (2006.01)

(52) U.S. Cl. ........ 701/400; 701/408; 701/410; 701/412; 701/437

(58) Field of Classification Search ........................ None
See application file for complete search history.

(56) References Cited

U.S. PATENT DOCUMENTS

| 6,278,942 | B1 * | 8/2001 | McDonough ................. 701/416 |
| 6,446,000 | B2 * | 9/2002 | Shimabara ..................... 701/428 |
| 2001/0013837 | A1 | 8/2001 | Yamashita et al. |
| 2001/0049582 | A1 | 12/2001 | Sakashita |
| 2005/0171688 | A1 | 8/2005 | Fujita et al. |
| 2007/0016367 | A1 | 1/2007 | Sakashita et al. |
| 2007/0225907 | A1 | 9/2007 | Oonishi et al. |

FOREIGN PATENT DOCUMENTS

| DE | 103 27 869 A1 | 1/2005 |
| EP | 1 804 025 A2 | 7/2007 |
| JP | A-2000-074199 | 3/2000 |
| JP | A-2004-61356 | 2/2004 |
| JP | A-2005-172628 | 6/2005 |
| JP | A-2007-127598 | 5/2007 |

OTHER PUBLICATIONS

Japanese Patent Office, Notification of Reasons for Refusal mailed Sep. 6, 2011 in Japanese Patent Application No. 2007-310904 w/Partial English-language Translation.

Chinese Patent Office, First Examination Opinion Notification mailed Feb. 29, 2012 in Chinese Patent Application No. 2008101734774 w/English-language Translation.

* cited by examiner

*Primary Examiner* — Paul Danneman
(74) *Attorney, Agent, or Firm* — Oliff & Berridge, PLC

(57) ABSTRACT

Information is acquired that indicates a current road on which a vehicle is traveling. Information is acquired that relates to a plurality of branching roads that branch off from the current road at a branching point that lies ahead in the direction of movement of the vehicle. In a situation where route guidance is not being used, a determination is made as to whether or not there is a possibility that the vehicle will proceed on one of the branching roads that is of a different type from the current road, instead of on one of the branching roads that is of the same type as the current road and has an attribute that is of the same type as an attribute of the current road. If it is determined that there is a possibility that the vehicle will proceed on one of the branching roads that is of a different type, guidance is performed that informs the driver that the possibility exists.

9 Claims, 4 Drawing Sheets

NAVIGATION DEVICE, NAVIGATION METHOD, AND NAVIGATION PROGRAM

INCORPORATION BY REFERENCE

The disclosure of Japanese Patent Application No. 2007-310904 filed on Nov. 30, 2007, including the specification, drawings and abstract is incorporated herein by reference in its entirety.

BACKGROUND OF THE INVENTION

1. Field of the Invention

The present invention relates to a navigation device, a navigation method, and a navigation program that perform driving guidance when route guidance is not being used.

2. Description of the Related Art

A technology is known that, when route guidance is being used, informs the driver when it is detected that the vehicle is being driven in a lane that deviates from the guidance route (for example, Japanese Patent Application Publication No. JP-A-2004-61356).

SUMMARY OF THE INVENTION

The known technology does not take into account a situation in which route guidance is not being used. For example, in a case where the road on which the vehicle is currently traveling is National Route A, which has a plurality of lanes, and the vehicle must turn right at the next intersection in order to continue driving on National Route A, if route guidance is not being used, guidance to turn right is not provided, so the driver may continue to drive in a no-turn lane and leave National Route A without noticing.

The present invention was devised in light of the foregoing issue and it is an object of the present invention to provide a technology that can prevent the driver from unknowingly leaving the road on which he or she wants to drive, even if route guidance is not being used.

In a situation where route guidance is not being used and a plurality of branching roads branch off from the current road on which the vehicle is traveling, the present invention prevents the driver from unknowingly leaving the road on which he or she wants to drive by determining whether or not there is a possibility that the vehicle will proceed on one of the branching roads that is of a different type from the current road, instead of on one of the branching roads that is of the same type as the current road and has an attribute that is of the same as an attribute of the current road. In a case where it is determined that such as possibility exists, the present invention performs guidance that informs the driver of the situation. That is, according to the present invention, when route guidance is not being used and there is a possibility that the vehicle will proceed on a road that is not of the same type as the road on which the vehicle is currently traveling, it is possible to inform the driver of the situation in advance. It is therefore possible to prevent the driver from unknowingly leaving the road on which he or she wants to travel, even when route guidance is not being used.

It is desirable for a current road information acquisition unit to specify the road on which the vehicle is traveling (the current road) and to acquire information on the current road. For example, a configuration can be used that acquires information that indicates the vehicle's current position based on signals from GPS satellites, a vehicle speed sensor, a gyroscopic sensor, and the like, and then specifies the current position and the current road by collating that information with map information. Information that indicates the current road may include, for example, a link number as information for identifying the road, as well as information that expresses an attribute of the road (for example, a road type, a route number, a road width classification (a classification according to the width of the road), a number of lanes, information that indicates a direction of the road at a branching point, and the like). This information may be stored in advance as map information in a storage medium in a navigation device, for example. Note that the information that indicates the current road may also be acquired by communication between vehicles, by communication between the vehicle and infrastructure, and the like.

It is desirable for a branching road information acquisition unit to acquire information that relates to a plurality of branching roads that branch off from the current road at a branching point that lies ahead in the direction of movement of the vehicle. That is, it is desirable for the branching point that lies ahead in the direction of movement of the vehicle to be specified and for information to be acquired that relates to the plurality of the roads (the branching roads) other than the current road that connect to the branching point. The information that relates to the branching roads may include, for example, information for identifying the branching roads and information that expresses attributes of the branching roads, as described above. The information that relates to the branching roads may also be acquired by communication between the vehicle and infrastructure.

When route guidance is not being performed by the navigation device, a road-to-travel determination unit determines whether or not there is a possibility that the vehicle will proceed on one of the plurality of the branching roads that is of a different type from the current road, instead of on one of the plurality of the branching roads that is of the same type as the current road and has an attribute that is of the same as an attribute of the current road. A branching road that has attributes with the same content as those of the current road is selected as the branching road of the same type. In a case where none of the plurality of the branching roads has attributes with the same content, the branching road that has attributes whose content is most similar to the attributes of the current road is selected as the branching road of the same type. The attributes and the standards that are used to make the selection may be defined as desired. For example, a selection standard that is used may be that the road type or the route number of the selected branching road is the same as that of the current road. In a case where neither the road type nor the route number is the same, a selection standard that is used may be that the road width classification is the same, that any increase or decrease in the number of lanes is within a specified range, that the angular difference between the direction of the current road and the direction of the branching road at the branching point is within 0°±specified angle, or the like. Any branching road other than the branching road that is selected as the branching road of the same type is called a branching road of a different type.

An embodiment may also be used in which a road-to-travel determination unit determines that there is a possibility that the vehicle will proceed on the branching road of the different type. The determination may be made, for example, based on the driver's operation of the turn signal or operation of the steering wheel while the vehicle is within a specified distance from the branching point, or based on the vehicle's lateral positioning on the current road. For example, it may be determined that there is a possibility that the vehicle will proceed on the branching road of the different type if the vehicle's lateral positioning on the road does not shift toward the branching road of the same type.

When it is determined that there is a possibility that the vehicle will proceed on the branching road that is of the different type, it is desirable for a guidance unit to perform guidance that makes the driver aware that the possibility exists. The guidance may be in the form of voice guidance, in the form of vibration of an object that the driver is touching, such as a seat, the steering wheel, or the like, or in the form of an image on a display.

The present invention may also include a lane information acquisition unit that acquires travel direction restriction information for a current lane in which the vehicle is traveling on the current road. In this configuration, the road-to-travel determination unit may refer to the travel direction restriction information for the current lane and, when the current lane restricts the vehicle to proceeding on the branching road of the same type, may determine that there is a possibility that the vehicle will not proceed on the branching road of the same type. In that case, if the vehicle continues to travel in the lane that restricts the vehicle to proceeding on the branching road of the same type, the driver can be made aware that the vehicle cannot proceed on the branching road of the same type.

It is desirable for the lane information acquisition unit to specify which lane among a plurality of lanes on the current road is the current lane and to acquire the travel direction restriction information for that lane. Configurations that can be used to specify the current lane include a configuration that acquires image information that includes the current road and then specifies the current lane based on various types of characteristic quantities in the image, a configuration that specifies the current lane by collating GPS signals and map information, and the like. In a case where the image information is used to specify the current lane, the lanes on the road can be specified based on various types of objects on the road, and the lanes on the road can be detected based on images that correspond to the various types of objects. If an image that corresponds to an object is detected, the relative positions of the vehicle and the lanes on the current road can be specified, making it possible to detect the current lane among the plurality of the lanes. Note that an object for specifying the current lane may be any sort of object that indicates a feature of a lane. For example, the object may be a line or a median strip that indicates a lane boundary, a shoulder of the road, a road sign in a lane, a structure, a road surface marking, or the like.

The travel direction restriction information is information that indicates restrictions on the direction of travel, such as right turn only, left turn only, no turn, and the like. The travel direction restriction information for the current lane can be acquired by referring to map information that includes the travel direction restriction information for each lane. Note that the travel direction restriction information can also be acquired by using the image information described above to detect a road surface marking, a sign, or the like.

The lane information acquisition unit may also acquire travel direction restriction information for each lane on the current road other than the current lane. The guidance unit may also refer to the travel direction restriction information for the each lane on the current road other than the current lane and may perform guidance to a lane that does not restrict the vehicle to proceeding on the branching road of the same type. This makes it possible to tell the driver to shift to a particular lane in order to proceed on the branching road of the same type. The travel direction restriction information for the each lane other than the current lane may be acquired from map information like that described above, or it may be acquired based on image information.

Note that a technique that performs the processing performed by the present invention, as described above, may also be implemented in the forms of a method and a program. In a situation where route guidance is not being used and a plurality of branching roads branch off from the current road, it is to be determined whether or not there is a possibility that the vehicle will proceed on one of the branching roads that is of a different type from the current road, instead of on one of the branching roads that is of the same type as the current road and has an attribute that is of the same as an attribute of the current road. In a case where it is determined that such as possibility exists, the method or the program performs guidance that informs the driver of the situation. Each of the navigation device, the program, and the method described above may be implemented in various forms, such as a stand-alone device and by using parts that are shared by various portions of the vehicle. The present invention may also be modified as necessary, such as by implementing some portions as software and other portions as hardware, and the like. The present invention may also take the form of a storage medium for a program that controls the navigation device. The storage medium is obviously considered to be exactly the same whether it is a magnetic storage medium, a magneto optical storage medium, or a storage medium that will be developed at a later time.

DETAILED DESCRIPTION OF THE PREFERRED EMBODIMENTS

Figure 1:
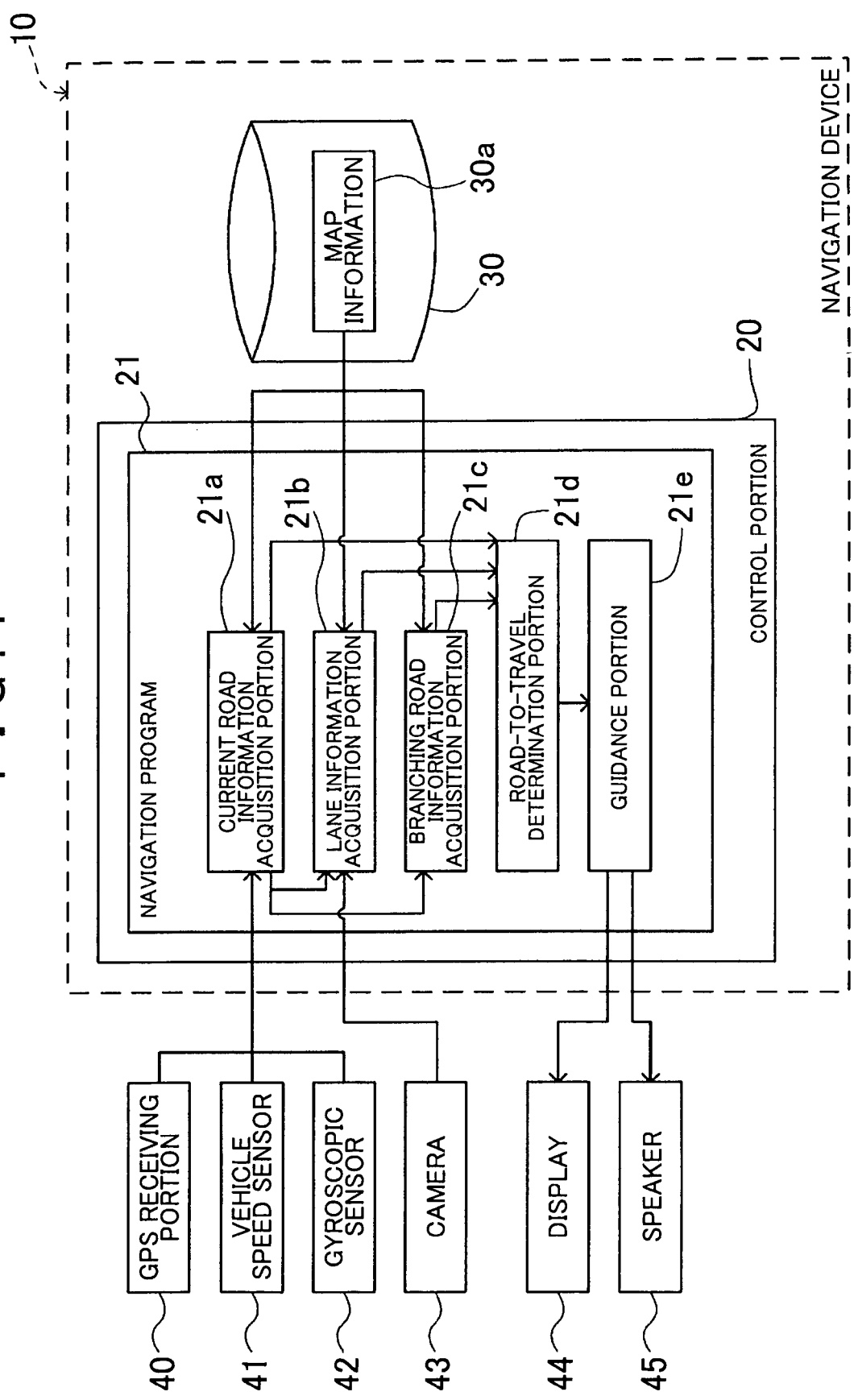
FIG. 1 is a block diagram of a navigation device according to an embodiment of the present invention.

An embodiment of the present invention will be explained in the order shown below.
(1) Configuration of Navigation Device
(2) Driving Guidance Processing
(3) Other Embodiments
(1) Configuration of Navigation Device FIG. 1 is a block diagram that shows a configuration of a navigation device 10 according to the present invention. The navigation device 10 includes a control portion 20 and a storage medium 30. The control portion 20 includes a CPU, a RAM, a ROM, and the like, and can execute programs that are stored in the storage medium 30 and the ROM. In the present embodiment, one of the programs that can be executed is a navigation program 21. The navigation program 21 includes a route search function that performs a route search from the vehicle's current position to a destination, as well as a route guidance function that performs route guidance based on a route that is derived from the results of the search. The navigation program 21 also includes a function that provides driving guidance to the driver when the route guidance function is not being performed, that is, when route guidance is not being used.

In order to implement the functions of the navigation program 21 described above, the vehicle (the vehicle in which the navigation device 10 is installed) is provided with a GPS receiving portion 40, a vehicle speed sensor 41, a gyroscopic sensor 42, a camera 43, a display 44, and a speaker 45. These units exchange signals with the control portion 20 through an interface that is not shown in the drawing.

The GPS receiving portion 40 receives radio waves from GPS satellites and, through the interface that is not shown in the drawing, outputs information for computing the current position of the vehicle. The control portion 20 acquires the current position of the vehicle by receiving the information. The vehicle speed sensor 41 outputs a signal that corresponds to a revolution speed of a wheel of the vehicle. The control portion 20 acquires the speed of the vehicle by receiving the signal through the interface that is not shown in the drawing. The gyroscopic sensor 42 outputs a signal that corresponds to a heading of the vehicle. The control portion 20 acquires a direction of movement of the vehicle by receiving the signal through the interface that is not shown in the drawing. The vehicle speed sensor 41 and the gyroscopic sensor 42 are used for correcting the current position of the vehicle that is specified based on the output signal from the GPS receiving portion 40, among other purposes. The current position of the vehicle is also corrected as necessary based on the driving path of the vehicle.

The camera 43 captures an image of the area around the vehicle and outputs image information that includes the road on which the vehicle is traveling (the current road). The control portion 20 acquires the image information of the image that includes the current road by receiving a signal through the interface that is not shown in the drawing. As long as it is able to capture an image that includes the current road, the camera 43 may be a front camera that photographs the road surface in front of the vehicle, and it may be a rear camera that photographs the road surface behind of the vehicle.

In the present embodiment, in order to implement the driving guidance by the navigation program 21, a current road information acquisition portion 21a, a lane information acquisition portion 21b, a branching road information acquisition portion 21c, a road-to-travel determination portion 21d, and a guidance portion 21e are provided. In addition, in order to implement the functions of the navigation program 21 described above, map information 30a is stored in the storage medium 30. The map information 30a includes node data that indicates nodes that are defined on the road, link data that indicates links between one node and another, and the like. The map information 30a is used for specifying the current position of the vehicle, for specifying the current road, for acquiring branching road information, for specifying a current lane, for determining a road to travel, for guidance, and the like. The node data includes a node number, node position coordinates, a link number of a link that connects to a node (a connecting link number), and the like. A branching point on a road is included in the map information 30a as a node. The link data includes a link number, a road type, a route number, a road width classification (a classification according to the width of the road), a number of lanes, travel direction restriction information for each lane, position coordinates for a shape interpolation point, and the like. The travel direction restriction information is information that indicates restrictions on the direction of travel, such as right turn only, left turn only, no turn, and the like. Note that the data configuration of the map information 30a described above is only an example, and the present invention is not limited to this configuration.

The current road information acquisition portion 21a is a module that implements in the control portion 20 a function that specifies the current road and acquires information on the current road. The current road information acquisition portion 21a acquires the output signals from the GPS receiving portion 40, the vehicle speed sensor 41, and the gyroscopic sensor 42 and collates them with the map information 30a in order to specify the current position of the vehicle and the current road, as well as to acquire information that indicates the current road. The information that indicates the current road may include, for example, a link number that serves as information for identifying the road, as well as information items that indicate attributes of the road (for example, the road type, the route number, the road width classification, the number of lanes, information that indicates the direction of the road at a branching point, and the like). The information items are acquired by referring to the node data, the link data, and the like that are included in the map information 30a. For example the information that indicates the direction of the road at a branching point can be derived from the position coordinates of the start point and the end point of a link that corresponds to the road. Note that the information that indicates the current road may also be acquired by communication between vehicles, by communication between the vehicle and infrastructure, and the like.

The lane information acquisition portion 21b is a module that implements in the control portion 20 a function that, in a lane information acquisition unit, specifies which lane among a plurality of lanes on the current road is the current lane and acquires the travel direction restriction information for the lanes on the current road, including the current lane. In the present embodiment, the image information captured by the camera 43 that includes the current road is acquired, and the current lane is specified based on the relative positions of the vehicle and objects on the road in the image information. The travel direction restriction information for the plurality of the lanes on the current road, including the specified current lane, is acquired by referring to the map information 30a.

The branching road information acquisition portion 21c is a module that implements in the control portion 20 a function that acquires information about a plurality of branching roads that branch off from the current road at a branching point that lies ahead in the direction in which the vehicle is proceeding. That is, the branching road information acquisition portion 21c specifies a branching point on the current road that lies ahead in the direction in which the vehicle is proceeding and acquires information about a plurality of roads (branching roads) other than the current road among the roads that connect to the branching point. The information about the branching roads may be, for example, link numbers for identifying the branching roads, information items like those described above that indicate the attributes of the branching roads, and the like. The information about the branching roads may be acquired through communication between the vehicle and infrastructure.

The road-to-travel determination portion 21d is a module that implements in the control portion 20 a function that, at a time when route guidance is not being used in the navigation device 10, determines whether or not there is a possibility that the vehicle will proceed on a branching road of a different type from the current road, among the plurality of the branching roads, that is other than a branching road of a same type that has the same type of attributes as the attributes of the current road. A branching road that has attributes with the same content as those of the current road is selected as the branching road of the same type. In a case where none of the plurality of the branching roads has attributes with the same content, the branching road that has attributes whose content is most similar to the attributes of the current road is selected as the branching road of the same type. The attributes and the standards that are used to make the selection may be defined as desired. For example, a selection standard that is used may be that the route number of the selected branching road is the same as that of the current road. In a case where the route number is not the same, a selection standard that is used may be that the road width classification is the same, that the number of lanes is similar (any increase or decrease in the number of lanes is within a specified range), that the direction in which the branching road extends from the branching point is similar to the direction in which the current road extends (the angular difference between the directions in which the roads extend is within 0°±specified angle), or the like. Note that any branching road other than the branching road that is selected as the branching road of the same type is called a branching road of a different type.

The guidance portion 21e is a module that implements in the control portion 20 a function that, when it is determined that there is a possibility that the vehicle will proceed on a branching road of a different type, allows the driver to be aware of that possibility. In the present embodiment, guidance is performed using the display 44 and the speaker 45. The guidance portion 21e has a drawing function for implementing guidance in the form of text and images, a function that generates a voice guidance signal and outputs it to the speaker 45, and the like.

The configuration of the navigation device 10 has been explained above.

(2) Driving Guidance Processing

Figure 2:
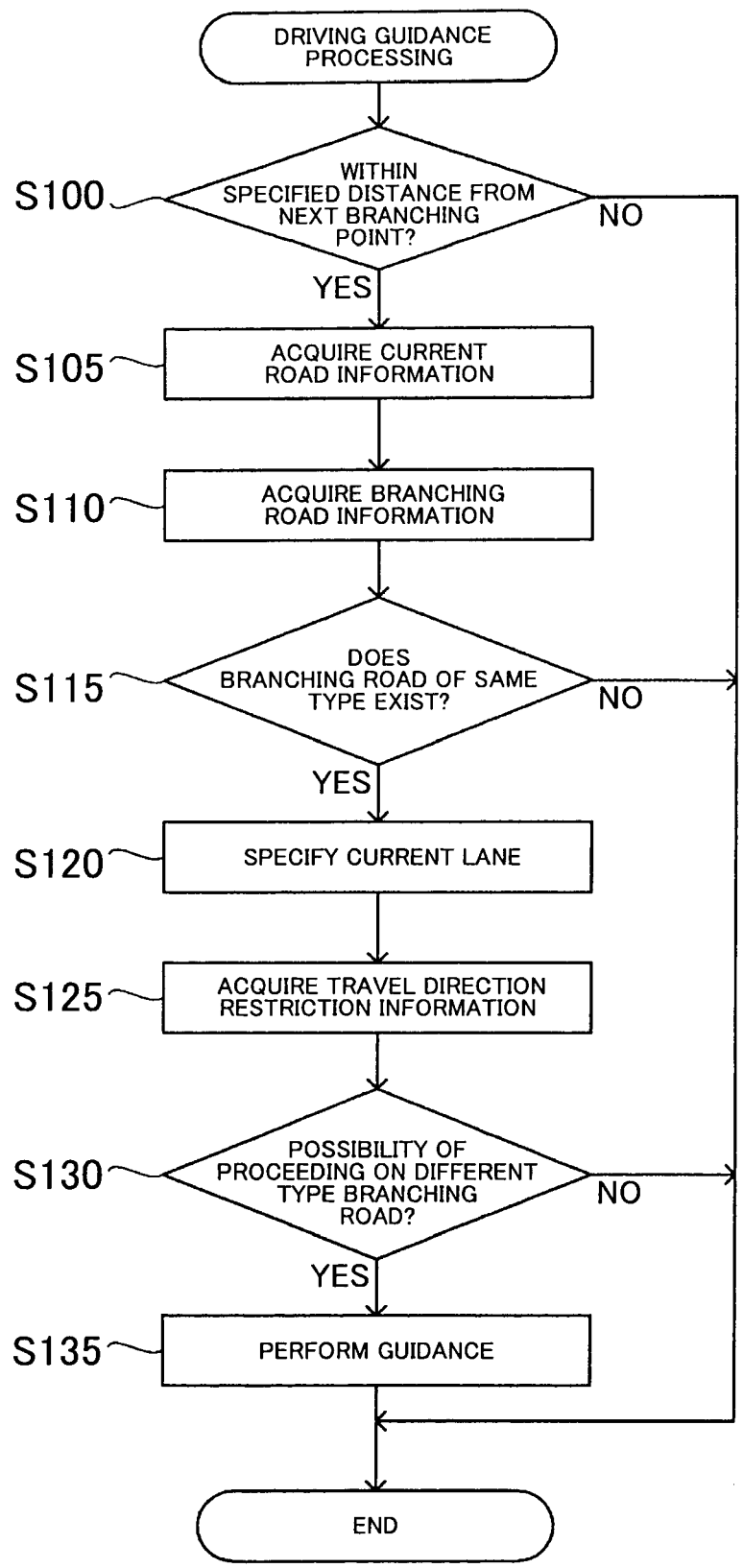
FIG. 2 is a flowchart that shows driving guidance processing according to the embodiment of the present invention.

Next, driving guidance processing that the navigation device 10 performs in the configuration described above will be explained. FIG. 2 is a flowchart that shows the flow of the driving guidance processing. The processing that is shown in FIG. 2 is processing that is performed repeatedly by the control portion 20 every time a specified time interval elapses while the navigation device 10 is not performing route guidance.

First, by executing processing of the road-to-travel determination portion 21d, the control portion 20 determines whether the vehicle has reached a position that is a specified distance from the next branching point (step S100). Specifically, the control portion 20 periodically executes processing in which the current road information acquisition portion 21a acquires the current position of the vehicle and the control portion 20 determines whether or not the vehicle is within the specified distance (for example, one kilometer) from the next branching point, based on the most recently acquired current position of the vehicle and on the map information 30a.

In a case where it is determined at step S100 that the vehicle has reached a position that is within the specified distance from the next branching point, the control portion 20 executes the processing in the current road information acquisition portion 21a to acquire information that indicates the current road (step S105). Specifically, the control portion 20 acquires, for example, the road type and the route number that is stored in association with the link that corresponds to the current road.

Next, the control portion 20 executes the processing of the branching road information acquisition portion 21c to acquire information about the branching roads (step S110). Specifically, the control portion 20 acquires, for example, the road types and the route numbers that are stored as the link data for the links that correspond to the branching roads that connect to the branching point that lies ahead in the vehicle's direction of travel.

Next, the control portion 20 executes the processing of the road-to-travel determination portion 21d to determine whether or not a branching road of the same type exists (step S115). Specifically, the control portion 20 compares, for example, the route number of the current road that was acquired at step S105 and the route numbers of a plurality of the branching roads that were acquired at step S110 to determine whether or not a branching road with the same route number as the route number of the current road (a branching road of the same type) exists.

In a case where it is determined at step S115 that a branching road of the same type does exist at a branching point that lies ahead, the control portion 20 executes the processing of the lane information acquisition portion 21b to specify the current lane (step S120). Specifically, the control portion 20 acquires the image information that the camera 43 captured and that includes the current road, then specifies the current lane based on the relative positions of the vehicle and objects on the road. The lanes on the road can be specified based on various types of objects on the road, and the lanes can be detected by using the images that correspond to the various types of objects. If images that correspond to the objects are detected, the relative positions of the vehicle and the lanes on the current road can be specified, and the current lane in which the vehicle is driving can be detected among a plurality of lanes. Note that an object that is used to specify the current lane may be any sort of object that indicates a feature of a lane. For example, the object may be a line or a median strip that indicates a lane boundary, a shoulder of the road, a road sign in a lane, a structure, a road surface marking, or the like. Note that a known technique (for example, pattern matching, edge extraction, the Hough transform, or the like) can be used to extract an image that shows a lane boundary line or a median strip.

Next, the control portion 20 executes the processing of the lane information acquisition portion 21b to acquire the travel direction restriction information (step S125). Specifically, after specifying the current lane, the control portion 20 refers to the link data for the current road to acquire, for example, the travel direction restriction information for one of one and a plurality of lanes on the current road, including the current lane. Note that the travel direction restriction information may also be acquired by using the image information described above to detect an image such as a road sign in the lane.

Next, the control portion 20 determines whether or not there is a possibility that the vehicle will proceed on a branching road of a different type (step S130). Specifically, the control portion 20 determines whether or not there is a possibility that the vehicle will proceed on a branching road of a different type by referring to the travel direction restriction information for the current lane that was acquired at step S125. For example, in a case where the travel direction restriction information for the current lane indicates that the current lane is a no-turn lane, the control portion 20 refers to the connecting link numbers in the node data that corresponds to the branching point in order to acquire the directions in which the plurality of the branching roads that branch off at the branching point extend. The control portion 20 specifies a branching road that extends straight ahead from the current road. If the route number of the specified branching road is not the same as the route number of the current road, the control portion 20 determines that there is a possibility that the vehicle will proceed on a branching road of a different type.

Figure 3A:
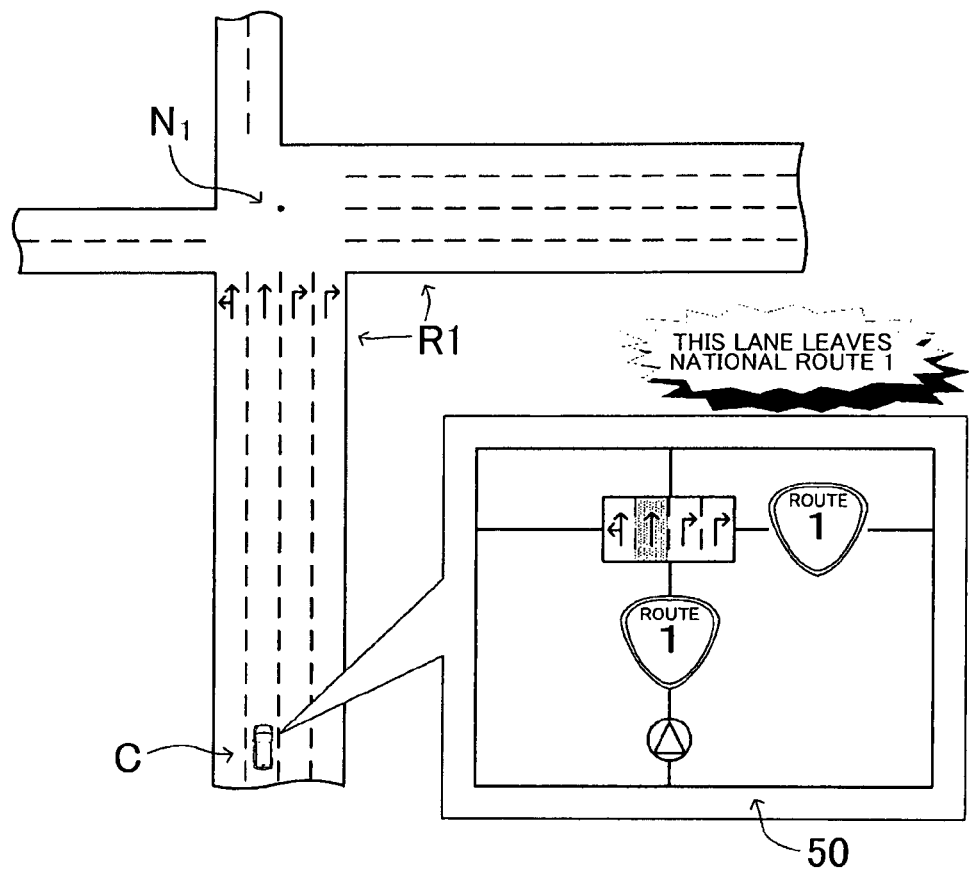
FIG. 3 is a figure for explaining examples of guidance according to the embodiment of the present invention.

When it is determined at step S130 that there is a possibility that the vehicle will proceed on a branching road of a different type, the control portion 20 performs guidance to communicate that possibility (step S135). Examples of the guidance will be explained using FIGS. 3A and 3B. FIG. 3A shows an example in which National Route 1 (R1), for which the route number is 1, turns to the right in relation to the direction of movement of a vehicle C. As shown in FIG. 3A, the road on which the vehicle C is traveling has four lanes. In a case where the vehicle C is traveling in a no-turn lane, voice guidance such as "This lane leaves National Route 1" or the like, for example, is output from the speaker 45 at a time when the vehicle C approaches the point within a specified distance from a branching point $N_1$. It is thus possible to make the driver aware that the vehicle C cannot proceed on a branching road of the same type if it continues to proceed in the current lane, because the current lane restricts the vehicle C to proceeding on the branding road of the same type.

The control portion 20 may also display guidance on the display 44, such as that shown on a screen 50. On the screen 50, the fact that the current lane is a no-turn lane at the next branching point $N_1$ is indicated by highlighting the image of the current lane more than the images of the other lanes. Further, displaying two images that indicate National Route 1 on either side of the branching point $N_1$ makes it possible to make the driver aware that it is necessary to turn right at the branching point $N_1$ in order to proceed on National Route 1. In other words, the guidance makes it possible for the driver to know which lane to choose in order to proceed on a branching road of the same type. Note that the control portion 20 may also refer to the travel direction restriction information for each lane other than the current lane in order to specify which lanes allow the vehicle C to proceed on a branching road of the same type. Then, in addition to the voice guidance described above, the control portion 20 may also provide voice guidance such as "Please change to the right lane to proceed on National Route 1" or the like.

Figure 3B:
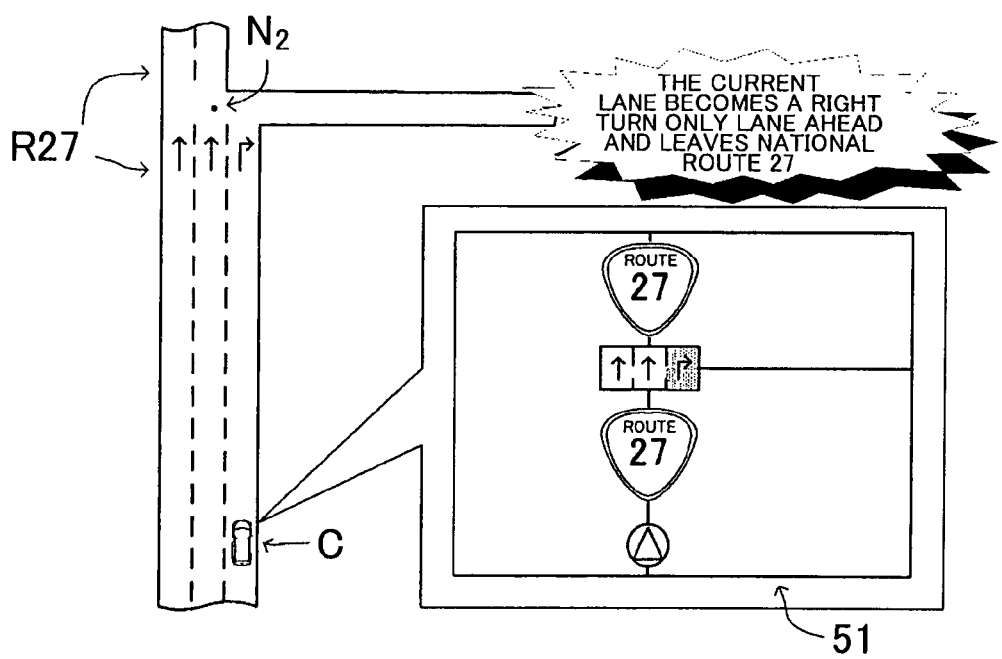

FIG. 3B shows an example in which National Route 27 (R27), for which the route number is 27, extends straight ahead in relation to the direction of movement of a vehicle C. The road on which the vehicle C is traveling has three lanes. In a case where the vehicle C is traveling in a right turn only lane, at a time when the vehicle C approaches a point within a specified distance from a branching point $N_2$, guidance such as that shown on a screen 51 is displayed on the display 44, and voice guidance such as "The current lane becomes a right turn only lane ahead and leaves National Route 27" or the like, for example, is output from the speaker 45. The fact that the current lane in which the vehicle is traveling is a right turn only lane at the next branching point $N_2$ and that it is necessary for the vehicle C to go straight ahead at the next branching point $N_2$ in order to proceed on National Route 27 is indicated on the screen 51.

Note that in a case where it is determined that the vehicle C has passed the branching point $N_2$ or has performed a lane change, the control portion 20 terminates the guidance on the display 44.

To take another example, when the vehicle is traveling on an expressway without operating the route guidance function, in a case where continuing to drive in the current lane will cause the vehicle to exit the expressway at the next interchange, to take another expressway in a different direction at the next junction, or the like, the configuration of the present embodiment can be effective.

As explained above, according to the present embodiment, when route guidance is not being used and there is a possibility that the vehicle will proceed on a road that is not of the same type as the road on which the vehicle is currently traveling, it is possible to inform the driver of the situation in advance. It is therefore possible to prevent the driver from unknowingly leaving the road on which he wants to travel, even when route guidance is not being used.

(3) Other Embodiments

The embodiment described above is one example of how the present invention can be practiced. However, various other types of embodiments can also be used as long as they make it possible to provide guidance to the driver in a case where, when route guidance is not being used, there is a possibility that, among a plurality of branching roads that branch off from the road on which the vehicle is currently traveling, the vehicle will proceed on a branching road of a different type instead of on a branching road of the same type, which has the same content of attributes as those of the current road. For example, an embodiment may also be used in which a road-to-travel determination unit determines that there is a possibility that the vehicle will proceed on the branching road of the different type, instead of the determination being made based on travel direction restriction information for the current lane. Specifically, the determination may be made, for example, based on the driver's operation of the turn signal or operation of the steering wheel, or based on the vehicle's lateral positioning on the current road while the vehicle is within a specified distance from the branching point. For example, in a case where the current road has only one lane, it may be determined that there is a possibility that the vehicle will proceed on the branching road of the different type if the vehicle's turn signal on the side toward the branching road of the same type is not operated, if the steering wheel is not operated toward the branching road of the same type, if the vehicle's lateral positioning on the road does not shift toward the branching road of the same type, or the like.

In the embodiment that was described above, an example was explained in which the determination of whether a branching road is of the same type as the current road or of a different type is made by determining whether or not the route number is the same. However, the determination may also be made by determining not only the route number, but also whether or not the road type is the same. In other words, a branching road that has both the same road type and the same route number as the road type and the route number of the current road may be determined to be the branching road of the same type. Note that the determination may also be made by determining only whether or not the road type is the same.

The navigation device 10 may also include a unit that acquires lane-by-lane congestion information from a traffic information center that provides lane-by-lane congestion information that is collected by a probe car or the like. In this configuration, the road-to-travel determination unit may determine the road to travel based on the lane-by-lane congestion information and the vehicle's speed. For example, the road-to-travel determination unit may acquire information indicating that a right turn lane is congested and that the average vehicle speed in the lane is 10 km/h. The control portion 20 may acquire the vehicle's speed from the vehicle speed sensor 41, and if the vehicle speed is close to 10 km/h, the control portion 20 may determine that the vehicle is in the right turn lane. In a case where the vehicle should be traveling in a no-turn lane in order to proceed on the branching road of the same type, but it is determined that the vehicle is in the right turn lane, as described above, the control portion 20 may determine that the vehicle cannot proceed on the branching road of the same type and perform guidance to that effect.

The timing of the guidance may also change in response to the traffic volume or the degree of congestion on the road. For example, in a case where the vehicle should be traveling in the right turn lane in order to proceed on the branching road of the same type, but the right turn lane is congested, the guidance may be performed at an earlier stage than in a case where the lane is not congested. In other words, the guidance may be performed at a stage when the distance from the branching point is longer.

Further, a branching road information acquisition unit may acquire same-type branching road information that indicates which branching road is the same type as the current road. In other words, in a case where the map information 30a includes same-type branching road information that says that a given link is a branching road of the same type as the current road, the road-to-travel determination unit may specify the road that is the branching road of the same type as the current road, based on the same-type branching road information. The road-to-travel determination unit may also determine whether or not there is a possibility that the vehicle will proceed on a branching road of a different type, instead of on the specified road.

Another embodiment of the driving guidance by a guidance unit may perform guidance by vibrating an object that the driver is touching, such as a seat, the steering wheel, or the like.

A method by which a lane information acquire unit specifies the current lane can use a configuration that specifies the current lane by collating a signal from the GPS receiving portion 40 with the map information 30a, instead of a configuration that uses image information.

Figure 4:
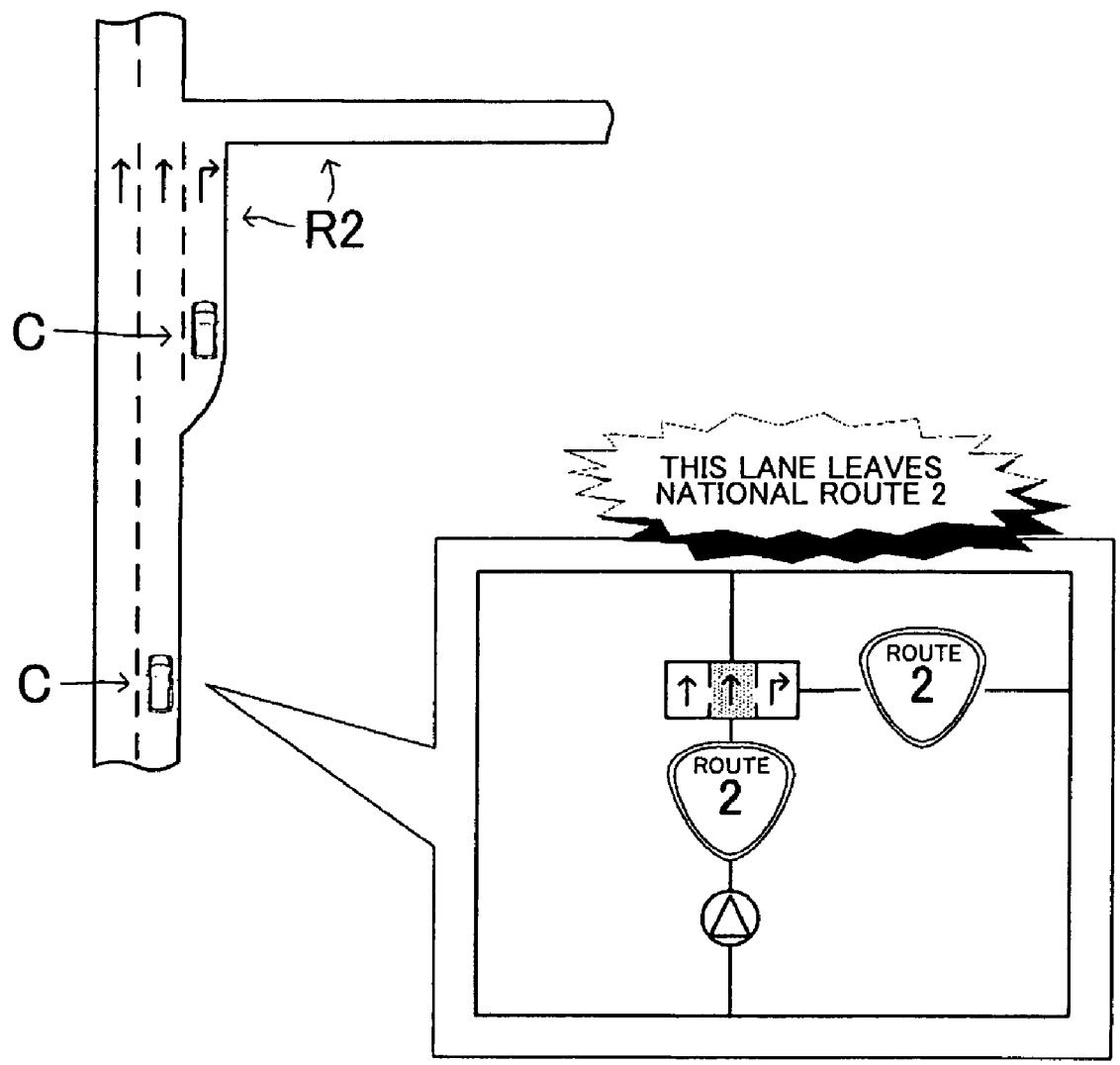
FIG. 4 is a figure for explaining an example of guidance according to another embodiment.

In a case where the vehicle is traveling in a lane where there is a possibility of proceeding on a branching road of a different type, the guidance unit performs guidance indicating that there is a possibility of proceeding on the branching road of the different type. However, in a case where the vehicle later shifts to a lane that will lead to a branching road of the same type, the guidance unit may terminate the guidance. For example, as shown in FIG. 4, in a case where National Route 2 (R2) turns to the right in relation to the direction of movement of a vehicle C and a right turn only lane is formed on the current road before the point where National Route 2 turns to the right, the guidance to the effect that there is a possibility of proceeding on the branching road of the different type may be terminated after the vehicle C enters the right turn only lane.

What is claimed is:

1. A navigation device for a vehicle, comprising:
a controller that provides branch point guidance without a user-requested route search being performed by:
acquiring information that indicates a current road on which the vehicle is traveling;
acquiring information that relates to a plurality of branching roads that branch off from the current road at a branching point that lies ahead in the direction of movement of the vehicle;
specifying a current lane in which the vehicle is traveling on the current road;
acquiring travel direction restriction information for the current lane;
specifying one of the plurality of branching roads that extends from the current road in a direction that corresponds to the travel direction restriction information for the current lane;
determining whether an attribute of the specified branching road is the same as an attribute of the current road;
when it is determined that the attribute of the specified branching road is not the same as the attribute of the current road, determining that there is a possibility that the vehicle will proceed on a different-type branching road at the branch point; and
when it is determined that there is a possibility that the vehicle will proceed on the different-type branching road, performing guidance indicating that there is a possibility that the vehicle will proceed on the different-type branching road.

2. The navigation device according to claim 1, wherein the controller:
acquires travel direction restriction information for each lane on the current road other than the current lane;
refers to the acquired travel direction restriction information for each lane on the current road other than the current lane; and
performs guidance to a lane that does not prevent the vehicle from proceeding on a same-type branching road.

3. The navigation device according to claim 1, wherein the attribute is a route number.

4. The navigation device according to claim 2, wherein the attribute is a route number.

5. A navigation method for a vehicle, comprising:
providing, with a controller, branch point guidance without a user-requested route search being performed by:
acquiring information that indicates a current road on which the vehicle is traveling;
acquiring information that relates to a plurality of branching roads that branch off from the current road at a branching point that lies ahead in the direction of movement of the vehicle;
specifying a current lane in which the vehicle is traveling on the current road;
acquiring travel direction restriction information for the current lane;
specifying one of the plurality of branching roads that extends from the current road in a direction that corresponds to the travel direction restriction information for the current lane;
determining whether an attribute of the specified branching road is the same as an attribute of the current road;
when it is determined that the attribute of the specified branching road is not the same as the attribute of the current road, determining that there is a possibility that the vehicle will proceed on a different-type branching road; and
when it is determined that there is a possibility that the vehicle will proceed on the different-type branching road, performing guidance indicating that there is a possibility that the vehicle will proceed on the different-type branching road.

6. The navigation method according to claim 5, further comprising:
acquiring travel direction restriction information for each lane on the current road other than the current lane;
referring to the acquired travel direction restriction information for each lane on the current road other than the current lane; and
performing guidance to a lane that does not prevent the vehicle from proceeding on a same-type branching road.

7. The navigation device according to claim 6, wherein the attribute is a route number.

8. The navigation device according to claim 6, wherein the attribute is a route number.

9. A non-transitory tangible computer-readable medium storing a navigation program, the program comprising:
Instructions, executable by a controller, for providing branch point guidance without a user-requested route search being performed by:
acquiring information that indicates a current road on which the vehicle is traveling;

acquiring information that relates to a plurality of branching roads that branch off from the current road at a branching point that lies ahead in the direction of movement of the vehicle;

specifying a current lane in which the vehicle is traveling on the current road;

acquiring travel direction restriction information for the current lane;

specifying one of the plurality of branching roads that extends from the current road in a direction that corresponds to the travel direction restriction information for the current lane;

determining whether an attribute of the specified branching road is the same as an attribute of the current road;

when it is determined that the attribute of the specified branching road is not the same as the attribute of the current road, determining that there is a possibility that the vehicle will proceed on a different-type branching road; and when it is determined that there is a possibility that the vehicle will proceed on the different-type branching road, performing guidance indicating that there is a possibility that the vehicle will proceed on the different-type branching road.

* * * * *